(12) United States Patent
Bowler et al.

(10) Patent No.: US 8,694,707 B2
(45) Date of Patent: **\*Apr. 8, 2014**

(54) MEMORY DATA TRANSFER METHOD AND SYSTEM

(75) Inventors: Michael Bowler, Ottawa (CA); Neil Hamilton, Kanata (CA)

(73) Assignee: Elliptic Technologies Inc., Ottawa, Ontario (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 13/416,162

(22) Filed: Mar. 9, 2012

(65) Prior Publication Data

US 2012/0166683 A1 Jun. 28, 2012

Related U.S. Application Data

(63) Continuation of application No. 11/185,688, filed on Jul. 21, 2005, now Pat. No. 8,156,259.

(51) Int. Cl.
*G06F 13/22* (2006.01)

(52) U.S. Cl.
USPC .......................................... 710/220; 713/153

(58) Field of Classification Search
None
See application file for complete search history.

(56) References Cited

U.S. PATENT DOCUMENTS

| | | | | |
|---|---|---|---|---|
| 4,504,902 | A | \* | 3/1985 | Gallaher et al. ............... 711/135 |
| 5,146,558 | A | \* | 9/1992 | Inoue ............................ 345/531 |
| 5,159,671 | A | | 10/1992 | Iwami |
| 5,253,340 | A | \* | 10/1993 | Inoue ............................ 345/502 |
| 5,574,863 | A | | 11/1996 | Nelson et al. |
| 5,982,672 | A | | 11/1999 | Moon et al. |
| 6,347,055 | B1 | \* | 2/2002 | Motomura ............... 365/189.05 |
| 6,813,688 | B2 | | 11/2004 | Wu et al. |
| 2003/0012055 | A1 | \* | 1/2003 | Gochi ....................... 365/189.01 |
| 2003/0069920 | A1 | | 4/2003 | Melvin et al. |
| 2005/0154773 | A1 | | 7/2005 | Ford et al. |
| 2005/0168475 | A1 | \* | 8/2005 | Honme ......................... 345/581 |
| 2006/0176068 | A1 | | 8/2006 | Holtzman et al. |
| 2006/0236000 | A1 | \* | 10/2006 | Falkowski et al. ............... 710/22 |
| 2007/0121733 | A1 | \* | 5/2007 | Cheung et al. ........... 375/240.29 |

FOREIGN PATENT DOCUMENTS

| | | |
|---|---|---|
| EP | 0 893 763 A1 | 1/1999 |
| EP | 1 457 859 A2 | 9/2004 |

\* cited by examiner

*Primary Examiner* — Elias Mamo
(74) *Attorney, Agent, or Firm* — Freedman & Associates

(57) ABSTRACT

A method and apparatus are disclosed for providing a DMA process. Accordingly, a DMA process is initiated for moving data from contiguous first locations to contiguous second locations and to a third location or third locations. Within the DMA process the data from each of the contiguous first locations is retrieved and stored in a corresponding one of the contiguous second locations and in the third location or corresponding one of the third locations. The DMA process is performed absent retrieving the same data a second other time prior to storing of same within the corresponding one of the contiguous second locations and in the third location or corresponding one of the third locations.

23 Claims, 5 Drawing Sheets

MEMORY DATA TRANSFER METHOD AND SYSTEM

FIELD OF THE INVENTION

The invention relates to the field of processors and more specifically to the field of direct memory access.

BACKGROUND OF THE INVENTION

Direct Memory Access (DMA) is well known in the software and hardware design of processor based systems. DMA transfer is often used to provide automated data transfer between memory locations absent direct involvement of a processor or processor based commands for performing each memory access operation. Typically, a processor command is used to instruct the DMA circuit and to initiate same. Thus with a single command or few commands a DMA allows for low processor overhead transfer of large amounts of data from one storage location to another—for example from a storage location to a cache memory.

Typical DMA circuits receive a data source location, a data destination location, and a length and then transfer length bytes of data from the source location to the destination location. The use of DMAs has become quite prolific, as have the complexity and functionalities thereof. For example, it is known to have a DMA that transfers data according to a table of data source locations, data destination locations and lengths.

It would be advantageous to provide an architecture for efficient DMA utilisation.

SUMMARY OF THE INVENTION

In accordance with the invention there is provided a method comprising initiating a DMA process for moving data from a plurality of contiguous first locations to a plurality of contiguous second locations and to at least a third location and within said DMA process retrieving the data from each of the plurality of contiguous first locations and storing the data in a corresponding one of the plurality of contiguous second locations and in the at least a third location absent retrieving the same data a second other time prior to storing of same within the corresponding one of the plurality of contiguous second locations and in the at least a third location.

In accordance with another aspect of the invention there is provided a circuit comprising a DMA transfer circuit for transferring data from a plurality of contiguous first locations to a plurality of contiguous second locations and to at least a third location and within said DMA process retrieving the data from each of the plurality of contiguous first locations and storing the data in a corresponding one of the plurality of contiguous second locations and in the at least a third location absent retrieving the same data a second other time prior to storing of same within the corresponding one of the plurality of contiguous second locations and in the at least a third location.

In accordance with another aspect of the invention there is provided a storage medium having data stored therein for when executing resulting in a design of a circuit comprising: a DMA transfer circuit for transferring data from a plurality of contiguous first locations to a plurality of contiguous second locations and to at least a third location and within said DMA process retrieving the data from each of the plurality of contiguous first locations and storing the data in a corresponding one of the plurality of contiguous second locations and in the at least a third location absent retrieving the same data a second other time prior to storing of same within the corresponding one of the plurality of contiguous second locations and in the at least a third location.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
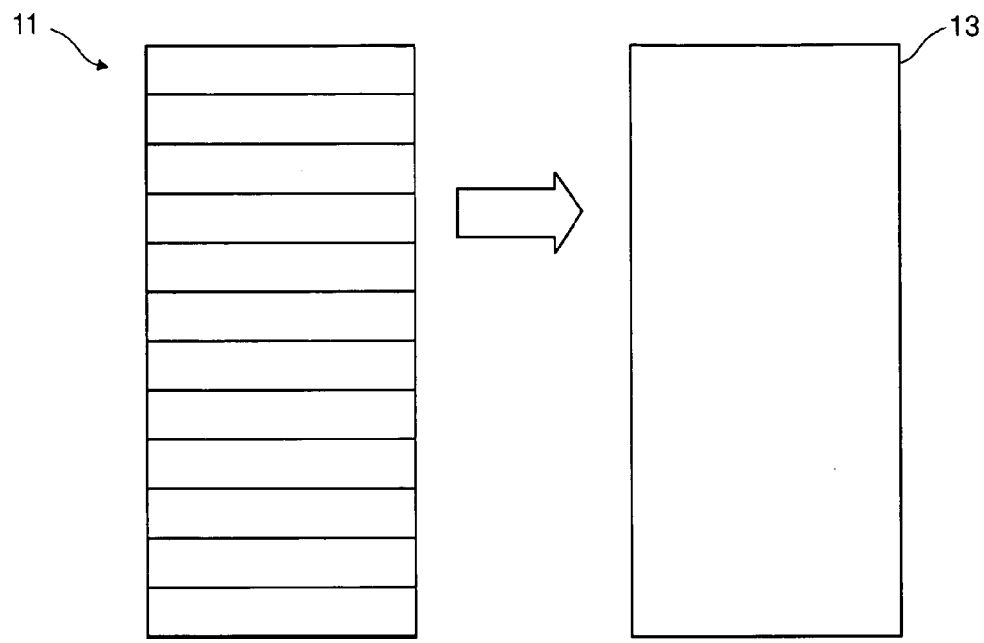
FIG. 1 illustrates a prior art DMA transfer process.

FIG. 1 illustrates a prior art DMA transfer process. A source location 11 is shown having 12 bytes of data stored in contiguous addressable locations therewith. An empty destination cache memory 13 is shown. By initiating the DMA, the 12 bytes are automatically copied to the destination cache memory 13 from the source location 11. Each byte is read from a respective address within the source location 11 and then stored at a destination address within the destination cache memory 13. The address from which data is read is incremented as is the address to which data is stored and then the process is repeated until all twelve bytes have been transferred.

Figure 2:
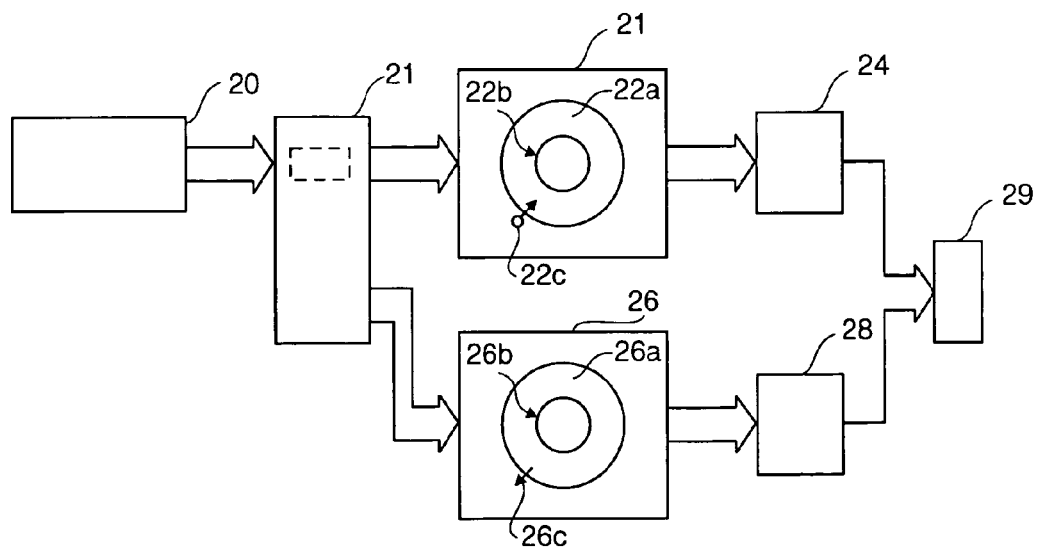
FIG. 2 illustrates a simplified data flow diagram is shown for a cryptographic process.

Referring to FIG. 2, a data flow diagram is shown for a cryptographic process. Data 20 for encryption is stored within a source memory buffer 21. The data 20 is provided serially to a cryptographic engine memory buffer 22 in the form of a ring buffer 22a having a write address pointer 22b and a read address pointer 22c offset one from another. Data provided to the cryptographic engine memory buffer 22 is then retrieved by the cryptographic processor 24 for encoding thereof. Also, the data 20 is provided serially to a hashing engine memory buffer 26 in the form of a circular buffer 26a having a write address pointer 26b and a read address pointer 26c offset one from another. Data provided to the hashing engine memory buffer 26 is then provided to the hashing processor 28 for hashing thereof. Results of the cryptographic processor and of the hashing processor are provided to an output memory buffer 29. Thus, the data 20 is encoded and is verifiable once decoded.

Figure 3:
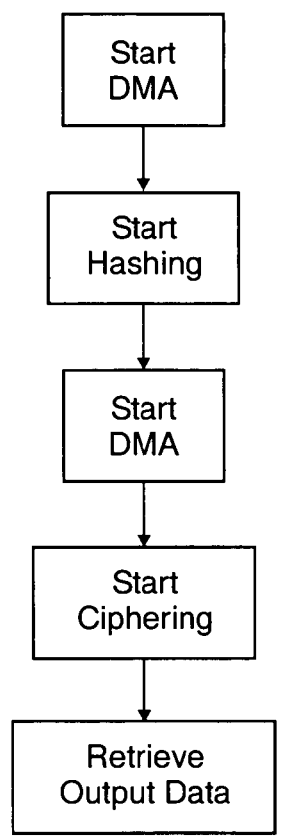
FIG. 3 illustrates a simplified flow diagram of an encryption process according to the prior art.

Referring to FIG. 3, a simplified flow diagram of an encryption process according to the prior art is shown. First, a DMA process is initiated for moving the data 20 from the memory buffer 21 to the hashing engine memory buffer 26 for hashing thereof. The hashing process is then initiated. While the hashing process is being executed, a DMA process is initiated for moving the data 20 from the memory buffer 21 to the cryptographic engine memory buffer 22. The cryptographic process is then initiated. When the hashing process and the cryptographic process are completed, the output data stored within the output memory buffer 29 is retrieved. This output data forms the encrypted data.

Figure 4A:
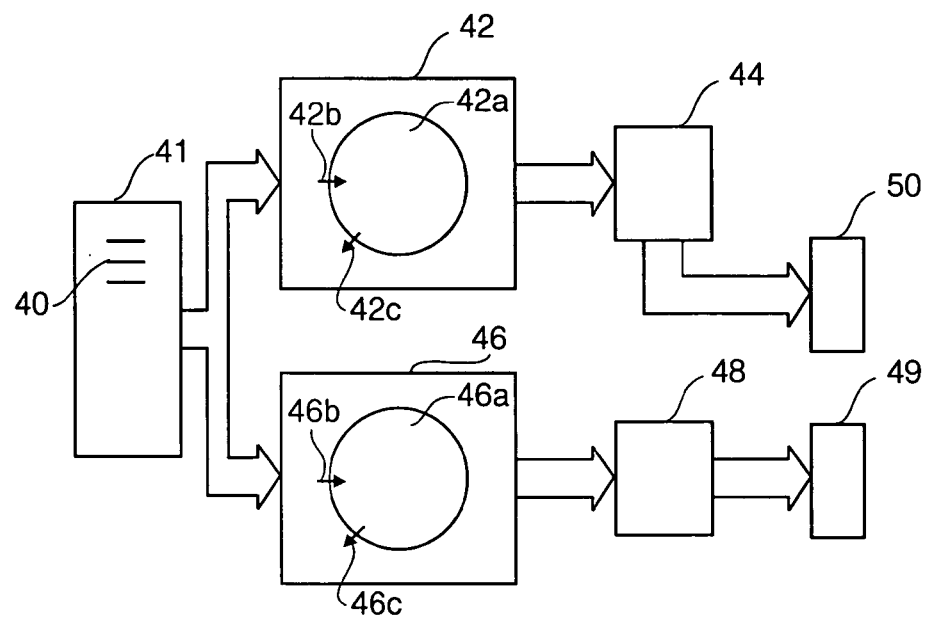
FIG. 4a illustrates a first data flow diagram according to the invention.

Referring to FIG. 4*a*, a data flow diagram according to the invention is shown. Data 40 for encryption is stored within a memory buffer 41. The data 40 is provided by a first DMA process serially to a cryptographic engine memory buffer 42 in the form of a circular buffer 42*a* having a write address pointer 42*b* and a read address pointer 42*c* offset one from another. Data provided to the cryptographic engine memory buffer 42 is then provided to the cryptographic processor 44 for encoding thereof. Simultaneously and by a same DMA process, the data 40 is provided serially to a hashing engine memory buffer 46 implemented as a circular buffer 46*a* having a write address pointer 46*b* and a read address pointer 46*c* offset one from another. Data provided to the hashing engine memory buffer 46 is then provided to the hashing processor 48 for hashing thereof. Results from the cryptographic processor are stored again within the circular buffer replacing the data within the cryptographic engine memory buffer 42. Results of the hashing processor are provided to an output memory buffer 49. The data within the cryptographic engine memory buffer 42 is moved to an output buffer 50 prior to storing of new data within the cryptographic engine memory buffer 42. Thus, the data 40 is encoded and is verifiable once decoded.

Figure 4B:
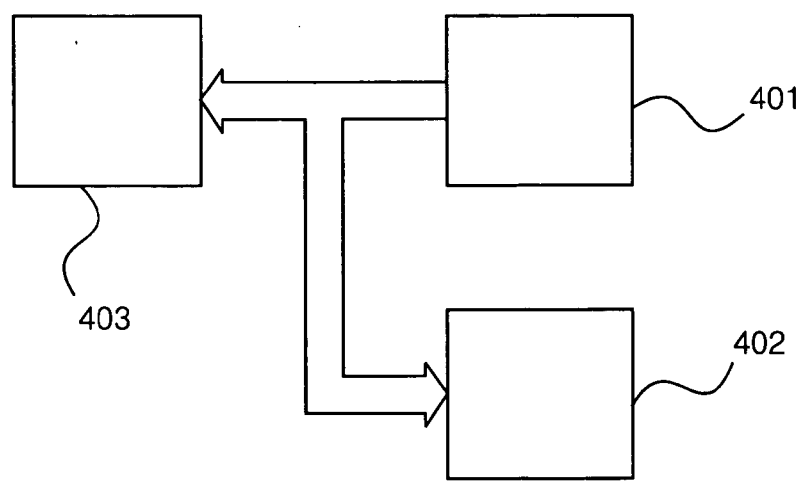
FIG. 4b illustrates a second data flow diagram according to the invention.

Referring to FIG. 4*b* shown is an alternative data flow diagram comprising a first security memory 401 having data stored therein, the data for being (de)cyphered. In order to achieve this function the data is decrypted and provided via DMA to a second security memory 402 and to memory buffer 403. The data is then retrieved from the second security memory 402 for verification of a hash thereof.

Since the DMA process operates to store data in two different buffers, only a single data retrieval is required to support two data storage operations. As such, to transfer data from one location to two buffers requires a single data retrieval and two data storage operations.

Figure 5:
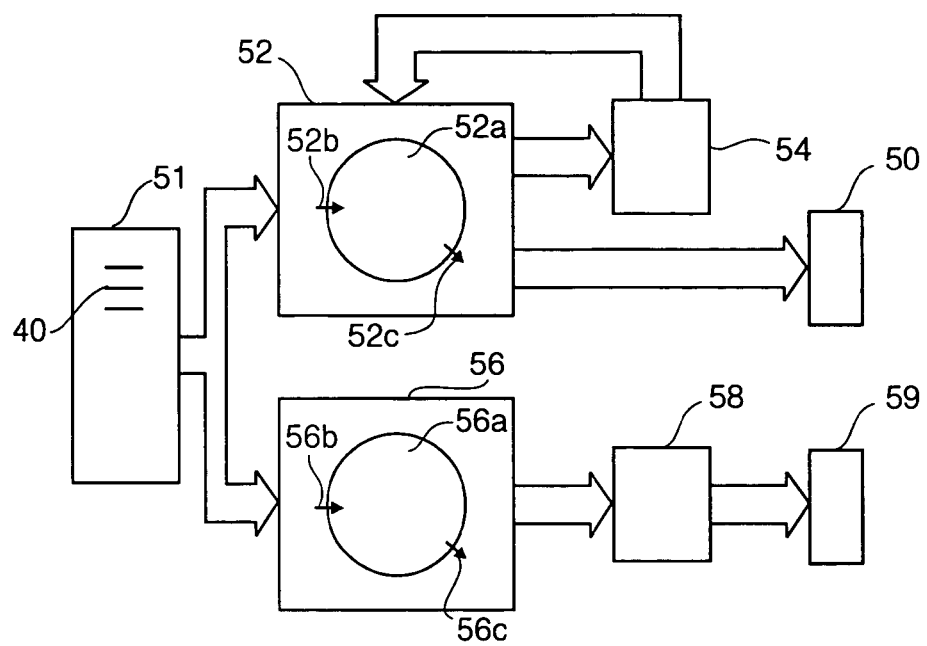
FIG. 5 illustrates a simplified flow diagram of an encryption process according to the invention.

Referring to FIG. 5, a simplified flow diagram of an encryption process according to the invention is shown. First, a DMA process is initiated for moving the data 40 from the memory buffer 51 to the cryptographic engine memory buffer 52 and to the hashing engine memory buffer 56 for hashing thereof. The hashing process and the cryptographic process are then initiated for the newly transferred data. When the hashing process is completed, the output data from the hashing process is stored within the output memory buffer 59. When the cryptographic process is completed, the output data is stored within the cryptographic engine memory buffer 52. The data within the cryptographic engine memory buffer is retrieved and stored within the output memory buffer 50. This output data forms the encrypted data. Accordingly, the simultaneous transfer of the data to two different memory buffers by the DMA results in a plurality of advantages. For example, the data 40 in the data buffer 51 is only retrieved once. This presents performance and power savings over prior art implementations. Further, the data is provided to each buffer in tandem reducing DMA data transfer latency for the second of the processes initiated. Further, when implemented in a hardware implementation, the resulting process is implementable in a highly efficient manner requiring few additional resources more than a DMA process reading from a single memory buffer and writing to a single memory buffer.

Also, as is evident, when the DMA process transfers data to each engine's memory buffer simultaneously, the source location of the cryptographic engine memory buffer is freed for accepting the encrypted data for storage therein. In the case of encryption processes, this is advantageous since a hashing operation typically requires a small output buffer space though the process may be processor intensive. Thus, the invention is implementable with a single source memory buffer acting as source and destination, another hashing buffer, and a small utility buffer for the cryptographic engine.

Figure 6:
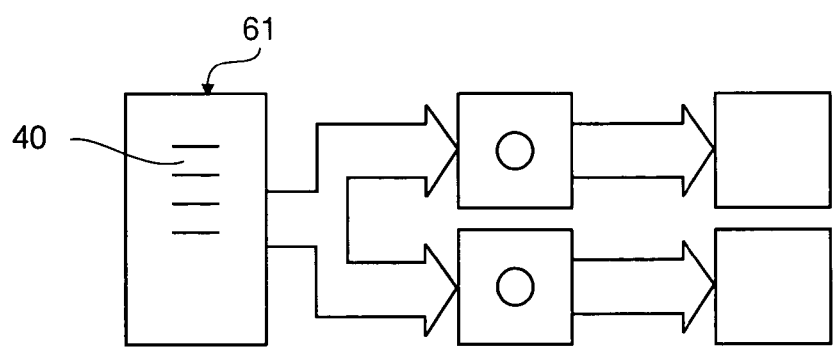
FIG. 6 illustrates a simplified block diagram of a circuit for performing the invention.

Referring to FIG. 6, a simplified block diagram of a circuit for performing the invention is shown. Here, the hashing engine memory buffer and the cryptographic engine memory buffer are mirrors one of the other. As shown, data 40 is retrieved from the data buffer 61 and is stored simultaneously within the two buffers, each forming a mirror of the other. From each buffer, the data is then retrievable separately by each of the hashing engine and the cryptographic engine. Though, such a circuit eliminates wait states associated with two engines retrieving data from a same memory buffer, there are other solutions to this same problem. As such, a circuit according to the block diagram of FIG. 6 is not preferred.

Figure 7:
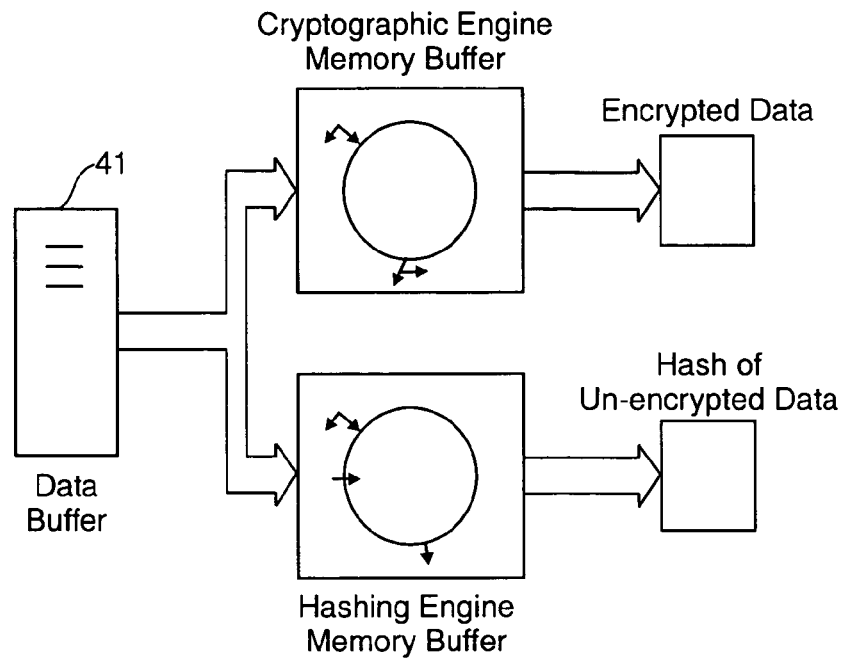
FIG. 7 illustrates a simplified block diagram of a circuit for performing the invention; and, FIG. 8 illustrates a simplified block diagram of another circuit for performing the invention.

Referring to FIG. 7, a more typical simplified block diagram of a circuit for performing the invention is shown. Here, the cryptographic engine memory buffer also acts as the cryptographic output data buffer, the data being encrypted in place. As such, the hashing engine memory buffer is distinct from and other than a mirror of the cryptographic engine memory buffer. Thus, the DMA engine maintains a current write address for each of the cryptographic engine memory buffer and the hashing engine memory buffer. The DMA engine also maintains a current read address for the data memory buffer 41. During each cycle, data at read address within the data memory buffer 41 is retrieved and is then stored in each of the current write address for the cryptographic engine memory buffer and the current write address for the hashing engine memory buffer. Each of the addresses—read address, current write address for the cryptographic engine memory buffer, and the current write address for the hashing engine memory buffer—is then incremented. Such a system allows for optimisiation of memory buffer sizes to suit the selected cryptographic processes.

Figure 8:
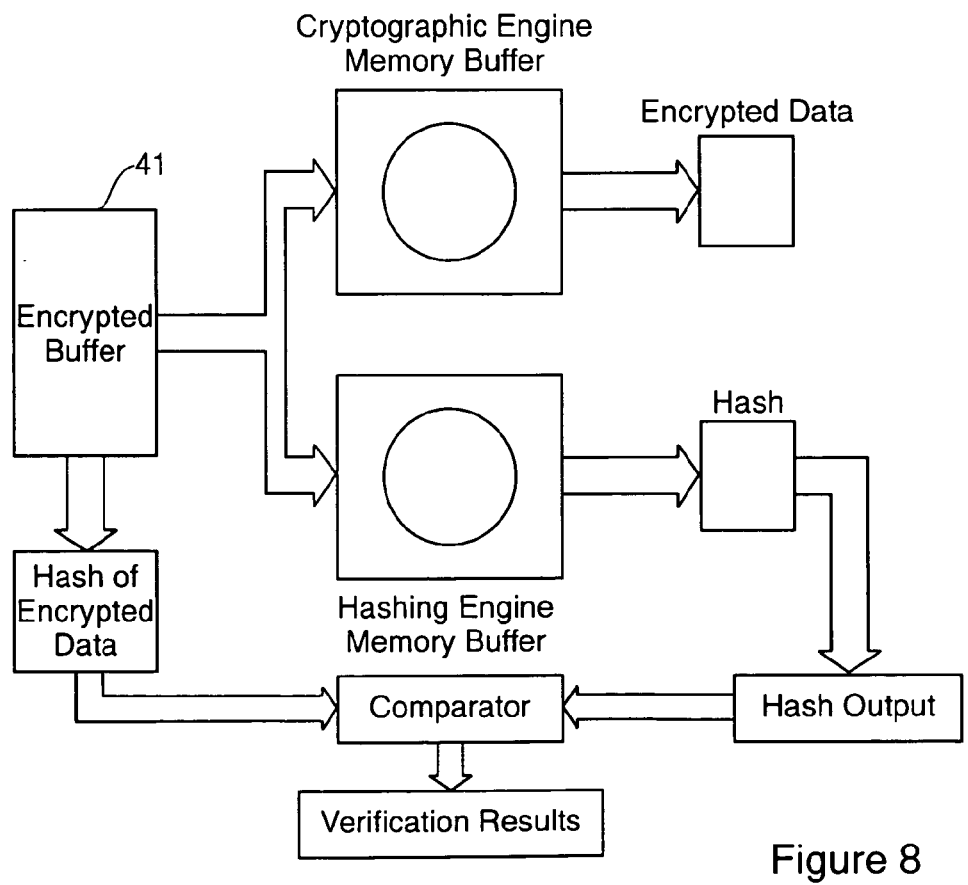

As is evident to those of skill in the art, the block diagram of FIG. 8 requires the following resources: 3 counters for storing and incrementing each of the three addresses, one data retrieval, one set up time of the data values on each of two data memory input ports, and one data write enable strobe. A typical DMA cycle requires 2 counters for storing and incrementing each of two addresses, one data retrieval, one set up time of the data values on one data memory input port, and one data write enable strobe. Thus, very few additional resources are consumed in performing a DMA operation according to the invention over a DMA operation according to the prior art. Further, the inventive DMA performs an equivalent operation to two DMA operation cycles. Thus the power savings are evident. Though the term counters is used above, the same is achievable using a single counter a number of adders. Implementation options for implementing DMA incrementable addressing are well known in the art and any such architecture is useful with the present invention.

Referring to FIG. 8, another simplified block diagram of a circuit for performing the invention is shown. Here, a cryptographic process is performed serially wherein a hash of the encrypted data is provided. For encrypted data in this form, a hash of the encrypted data is necessary to verify the data as is decryption of the encrypted data. A DMA process is initiated for moving the encrypted data to both the cryptographic engine memory buffer and to the hashing engine memory buffer. The data within the cryptographic engine memory buffer is decrypted and data within the hashing engine memory buffer is hashed. The hashing result is then used to verify the received encrypted data.

Though the invention is described with reference to cryptographic processors, it is equally applicable to other processes wherein same data is required by several different processor operations and wherein a DMA process for duplicating data into two different memory buffers for use by two different processors for performing different operations exist. Significantly, it is applicable to processes requiring some very small buffers and other larger buffers for data processing of same data.

Numerous other embodiments may be envisaged without departing from the spirit or scope of the invention.

What is claimed is:

1. A method comprising:
    initiating a DMA (Direct Memory Access) process for, from a plurality of contiguous first locations, moving data to a plurality of contiguous second locations and moving the data to at least a third location, the DMA process for other than mirroring the data, and within said DMA process:
    retrieving the data from each of the plurality of contiguous first locations to a memory within a processor, the memory within the processor for temporary storage of the retrieved data;
    storing the retrieved data from the memory within the processor to a corresponding one of the plurality of contiguous second locations; and
    without retrieving the data another time therebetween, storing the retrieved data from the memory within the processor to the at least a third location,
    wherein the plurality of contiguous second locations forms a memory buffer for having the data duplicated therein, and wherein the at least a third location forms one of a memory buffer for having the data duplicated therein and a memory buffer supporting inline processing of data stored therein; and
    wherein the plurality of contiguous second locations is associated with a cryptographic process.

2. The method according to claim 1 comprising providing a first indicator for addressing each of the plurality of contiguous first locations and incrementing the first indicator between data retrieval operations, the first indicator used for addressing each of the plurality of contiguous second locations and each of the at least a third location.

3. The method according to claim 1 comprising providing a first indicator for addressing each of the plurality of contiguous first locations and incrementing the first indicator between data retrieval operations, and a second indicator for addressing each of the plurality of contiguous second locations and incrementing the second indicator between data retrieval operations and each of the at least a third location.

4. The method according to claim 1 comprising providing a first indicator for addressing each of the plurality of contiguous first locations and incrementing the first indicator between data retrieval operations, and a second indicator for addressing each of the plurality of contiguous second locations and incrementing the second indicator between data retrieval operations, and a third indicator for addressing each of the at least a third location and incrementing the third indicator between data retrieval operations.

5. The method according to claim 1 comprising providing a first indicator for addressing each of the plurality of contiguous first locations and incrementing the first indicator between data retrieval operations, the first indicator used for addressing each of the plurality of contiguous second locations and other than for addressing each of the at least a third location.

6. The method according to claim 5 wherein the at least a third location comprises a smaller memory buffer than the plurality of contiguous second locations.

7. The method according to claim 6 wherein the at least a third location forms a memory buffer associated with a result for use in verifying resulting data.

8. A method according to claim 7 wherein the at least a third location comprises a single memory location.

9. The method according to claim 1 comprising:
    processing of data stored within the plurality of contiguous second locations by the cryptographic process to produce result data, the result data stored in the plurality of contiguous first locations.

10. The method according to claim 1 wherein the DMA process is initiated with a single command.

11. The method according to claim 1 wherein the DMA process is initiated with from one to three commands.

12. A circuit comprising:
    a DMA (Direct Memory Access) transfer circuit configured to transfer, from a plurality of contiguous first locations, data to a plurality of contiguous second locations and to transfer the data to at least a third location, the DMA process for other than mirroring the data, and within said DMA process:
    retrieving the data from each of the plurality of contiguous first locations to a memory within a processor, the memory within the processor for temporary storage of the retrieved data;
    storing the retrieved data from the memory within the processor to a corresponding one of the plurality of contiguous second locations; and
    without retrieving the data another time therebetween, storing the retrieved data from the memory within the processor to the at least a third location,
    wherein the plurality of contiguous second locations forms a memory buffer for having the first data duplicated therein, and wherein the at least a third location forms one of a memory buffer for having the first data duplicated therein and a memory buffer supporting inline processing of data stored therein; and
    wherein the plurality of contiguous second locations is associated with a cryptographic process.

13. A circuit according to claim 12 comprising:
    a first indicator for addressing each of the plurality of contiguous first locations and incrementing the first indicator between data retrieval operations, the first indicator used for addressing each of the plurality of contiguous second locations and each of the at least a third location.

14. The circuit according to claim 12 comprising: a first indicator for addressing each of the plurality of contiguous first locations and incrementing the first indicator between data retrieval operations, the first indicator used for addressing each of the plurality of contiguous second locations and other than for addressing each of the at least a third location.

15. The circuit according to claim 14 wherein the at least a third location comprises a smaller memory buffer than the plurality of contiguous second locations.

16. The circuit according to claim 15 wherein the at least a third location forms a memory buffer associated with a result for use in verifying resulting data.

17. The circuit according to claim 16 wherein the at least a third location comprises a single memory location.

18. The circuit according to claim 12 comprising: a processor for processing of data stored within the plurality of contiguous second locations by the cryptographic process to produce result data, the result data stored in the plurality of contiguous first locations.

19. A method comprising:
  initiating a DMA (Direct Memory Access) centered process, the DMA centered process comprising:
    a first engine process, wherein said first engine process is a cryptographic process;
    a second engine process; and
    a DMA process for, from a plurality of contiguous first locations, moving data to a plurality of contiguous second locations for use in the first engine process and absent another read operation moving the data to at least a third location for use in the second engine process, the DMA centered process for other than mirroring data, and for providing first processed data and second processed data different from the first processed data, the plurality of contiguous second locations forms a memory buffer for having the first data duplicated therein, and wherein the at least a third location forms one of a memory buffer for having the first data duplicated therein and a memory buffer supporting inline processing of data stored therein.

20. A circuit comprising:
  a DMA (Direct Memory Access) circuit configured to retrieve data from each of a plurality of contiguous first locations, storing the data in a corresponding one of a plurality of contiguous second locations and storing the data in at least a third location, wherein during a DMA process said data is retrieved only once, wherein during said DMA process said retrieving data is performed prior to said storing the data in the corresponding one of the plurality of contiguous second locations, and wherein during said DMA process said retrieving data is performed prior to storing the data in the at least a third location;
  a first engine circuit configured to retrieve data stored in the plurality of contiguous second locations, for performing a first data process thereon generating first processed data, wherein said first engine circuit is a cryptographic engine; and
  a second engine circuit configured to retrieve data stored in the at least a third location, for performing a second data process thereon generating second processed data other than a mirror of the first processed data, the plurality of contiguous second locations forms a memory buffer for having the first data duplicated therein, and wherein the at least a third location forms one of a memory buffer for having the first data duplicated therein and a memory buffer supporting inline processing of data stored therein.

21. A method according to claim 1 wherein the DMA process reads each datum once and stores each datum two or more times.

22. The method of claim 1, wherein the at least a third location is associated with a hashing process.

23. The circuit of claim 20, wherein the second engine circuit is a hashing engine.

* * * * *